(12) United States Patent
Cook et al.

(10) Patent No.: US 6,453,939 B1
(45) Date of Patent: Sep. 24, 2002

(54) FLOTATION CELL FLUID LEVEL CONTROL APPARATUS

(75) Inventors: Robert D. Cook, Salt Lake City; Jerry W. Hunt, Murray, both of UT (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 08/886,708

(22) Filed: Jul. 1, 1997

(51) Int. Cl.$^7$ .............................. F16K 31/02; B03D 1/14
(52) U.S. Cl. ..................... 137/392; 137/395; 137/398; 137/412; 209/168
(58) Field of Search ................... 137/392, 395, 137/398, 412, 428, 554, 558; 73/305, 307, 308, 314; 209/164, 168, 170, 192; 251/333, 334, 248, 249.5

(56) References Cited

U.S. PATENT DOCUMENTS

| | | | | |
|---|---|---|---|---|
| 1,124,856 A | * | 1/1915 | Callow | 209/170 |
| 1,582,715 A | * | 4/1926 | Wensley | 137/398 |
| 1,722,160 A | * | 7/1929 | Smith | 137/392 |
| 1,832,809 A | * | 11/1931 | Hudson | 137/412 |
| 1,908,207 A | * | 5/1933 | Wrenn | 137/428 |
| 2,203,472 A | * | 6/1940 | Schmidt | 137/412 |
| 2,338,773 A | * | 1/1944 | Loumiet Et Lavigne | 137/392 |
| 2,612,180 A | * | 9/1952 | Schwarzkopf | 137/392 |
| 2,757,326 A | * | 7/1956 | Boundy | 137/412 |
| 3,025,872 A | * | 3/1962 | McLerran et al. | 137/398 |
| 3,095,179 A | * | 6/1963 | Lebow | 251/333 |
| 3,131,335 A | * | 4/1964 | Berglund et al. | 137/392 |
| 3,255,882 A | * | 6/1966 | McCarthy et al. | 209/168 |
| 3,444,892 A | * | 5/1969 | Doyle et al. | 251/333 |
| 3,471,010 A | * | 10/1969 | Pick et al. | 209/168 |
| 3,671,142 A | * | 6/1972 | Calabrese | 137/392 |
| 3,795,256 A | * | 3/1974 | Gordon | 137/386 |
| 3,821,900 A | * | 7/1974 | Preikschat | 137/392 |
| 4,186,849 A | * | 2/1980 | Spangler | 137/392 |
| 4,188,634 A | * | 2/1980 | Anderka et al. | 137/392 |
| 4,215,574 A | | 8/1980 | Godeux | 73/307 |
| 4,316,600 A | * | 2/1982 | Parise et al. | 251/333 |
| 4,416,153 A | * | 11/1983 | Williams | 137/392 |
| 4,660,586 A | * | 4/1987 | Knapp et al. | 137/392 |
| 4,662,390 A | * | 5/1987 | Hawkins | 137/392 |
| 4,668,382 A | | 5/1987 | Jameson | 209/164 |
| 4,877,059 A | * | 10/1989 | Popescu | 137/554 |
| 5,011,595 A | | 4/1991 | Meenan et al. | 209/166 |
| 5,039,400 A | | 8/1991 | Kallioinen et al. | 209/164 |
| 5,073,253 A | | 12/1991 | Bishop et al. | 209/164 |
| 5,096,029 A | * | 3/1992 | Bauer et al. | 251/333 |
| 5,176,167 A | * | 1/1993 | Tiao | 137/572 |
| 5,188,726 A | | 2/1993 | Jameson | 209/164 |
| 5,251,764 A | | 10/1993 | Niitti et al. | 209/169 |
| 5,332,100 A | | 7/1994 | Jameson | 209/164 |
| 5,368,166 A | * | 11/1994 | Chumak et al. | 209/168 |
| 5,578,198 A | * | 11/1996 | Chumak et al. | 209/168 |
| 5,687,609 A | | 11/1997 | Schmalzel | 73/305 |
| 5,965,857 A | * | 10/1999 | Hughes | 209/168 |

* cited by examiner

Primary Examiner—George L. Walton
(74) Attorney, Agent, or Firm—TraskBritt

(57) ABSTRACT

A fluid level control apparatus for selectively controlling the movement of liquid flowing out of a flotation cell is described. The fluid level control apparatus is significantly reduced in size in comparison with the flotation cell or cells to which it is connected which enables less expensive construction and reduced operating costs in terms of both the equipment and the plant as a whole. The fluid level control apparatus comprises a vessel having a valve positioned therein which includes a valve body structured with a curved surface which provides selective and finite control of fluid flowing through the vessel of the control apparatus.

38 Claims, 8 Drawing Sheets

FLOTATION CELL FLUID LEVEL CONTROL APPARATUS

BACKGROUND

1. Field of the Invention

This invention relates to apparatus for controlling the fluid level in, between and when discharging liquid from flotation cells, or tanks, which are used for separation of liquid and solid phases of an influent fluid. Specifically, this invention relates to fluid control apparatus which operates on a reduced scale, and with a specially designed valve to provide more controlled flow of fluid.

2. Statement of the Art

Flotation cells or tanks are widely used in a variety of industries, such as oil, wastewater treatment, pulp and paper, and mining and mineral reclamation, to separate an influent liquid or feed slurry into a clarified liquid phase and a solid or particulate matter phase. Flotation tanks generally operate by facilitating the flotation of solid or particulate matter, such as mineral-bearing particles, to the top of the fluid bed contained in the tank, while a liquid phase develops toward the bottom of the tank. The liquid phase may typically contain varying amounts of solids or particulates which are not completely separated from the liquid. Thus, the liquid phase may range from a relatively clarified liquid to a pulp or slurry. Flotation of the solid phase or mineral particles to the top of the tank is often facilitated by such means as introducing air into the influent liquid to form a froth which captures or binds the solid or mineral particles matter and floats them to the top of the liquid volume in the tank. The solids or concentrated mineral particles matter which have been floated to the top of the liquid level are typically removed from the tank by causing the floating material to overflow into a launder, usually positioned about the periphery of the tank.

It is important to the efficient operation of flotation cells that the liquid level in the tank be maintained within a certain specified range so that the floating mineral concentrate of froth bed also remains at a specified level in the flotation cell to optimize recovery of the solid or particulate matter. In other words, if the liquid level in the flotation cell is too low, the separated solids or mineral concentrate, also referred to herein as "the float," will remain afloat on the liquid volume and will not overflow into the launder, thereby increasing the residency time of the float. The longer the float stays in the tank, the greater the possibility that the solid or mineral concentrate will sink back into the liquid volume and decrease the efficiency of the separation process. Conversely, if the liquid level in the tank is too high, the float may move efficiently to the overflow launder, but an increased amount of liquid will overflow and enter the launder as well. An inordinate amount of liquid in the overflow launder reduces the efficiency of the later processing of the mineral concentrate.

Thus, it has been recognized for some time that it is beneficial to the operation of flotation tanks to provide means for controlling the liquid (i.e., pulp or slurry) level in the tank. Control devices which are conventionally used in industry comprise a separate tank, often termed a "box," which is positioned externally to the flotation cell. The control box is in fluid communication with the flotation cell via one or more conduits interconnected between the flotation cell and the control box. In large plant operations, control boxes are typically interconnected between two adjacent flotation cells and are in fluid communication with both flotation cells. Conventional control boxes generally include a valve positioned internally to the box which operates to let fluid flow through the box from one flotation cell to the next adjacent flotation cell, thereby modifying the liquid level in both flotation cells.

Conventional fluid level control boxes tend to be substantially the same height as the flotation cell since the liquid level in the control box is maintained at approximately the same depth as the liquid in the flotation cell. Thus, for example, the control box may range in height from five feet to twenty feet. The length of conventional control boxes may generally be just short of the diameter of the flotation cell (e.g., three to six feet or greater) and may be one to five feet wide. In many large industrial applications, several flotation cells are positioned adjacent each other and are all placed in fluid communication with one or more adjacent flotation cells so that the liquid flow from one flotation cell is directed to the next adjacent cell, and so on. Conventional liquid level control boxes are positioned between adjacent flotation cells so that the liquid flowing from a first flotation cell enters into the control box. Liquid then enters into the next adjacent flotation cell through a conduit interconnected between the control box and the second flotation cell. By so arranging the flotation cells and liquid control boxes therebetween, the liquid level in each individual cell of a grouping of flotation cells can be optimally controlled.

One of the major drawbacks encountered with use of conventional liquid control boxes is their size, which not only increases capital costs in operation of the flotation cells, but limits the area capacity and, therefore, the number of flotation cells which may be installed at a given plant site. That is, conventional fluid control boxes are so large, and must necessarily be located between adjacent flotation cells, that they take up vital space which may be used for the installation of more flotation cells or which may be used for other purposes. Furthermore, when maintenance is required on conventional control boxes, the flotation cells to which the control box is attached must be taken off line while repairs are effected.

Additionally, the control valves of known liquid control boxes are, by virtue of their configuration, unable to provide finely controlled release of liquid through the control box. More specifically, known control valves provide an initial rapid flow rate of liquid which levels off quickly as the valve is opened. The fluid flow dynamics of conventional fluid level control boxes are, therefore, less subject to finite control.

It would be advantageous, therefore, to provide a fluid level control apparatus which provides finely controlled fluid flow therethrough, which provides ease of maintenance and repair, and which reduces capital costs by reducing the size and operation of the liquid level control apparatus and by enabling more flotation cells to be installed at a plant site,

SUMMARY OF THE INVENTION

In accordance with the present invention, a flotation cell liquid level control apparatus is configured for increased control of fluid flow therethrough and is structured to be reduced in size to increase operation efficiency and to increase area capacity for the placement and operation of flotation cells. The flotation cell liquid control apparatus of the present invention may be employed in connection with various types of flotation cells, and may be employed for use in connection with one or more flotation cells to control the liquid level in one flotation cell or adjacent flotation cells.

The flotation cell liquid level control apparatus of the present invention generally comprises a vessel which is located externally to a flotation cell and is of significantly smaller area in cross section than the flotation cell, or cells, to which it is connected. The smaller size of the control apparatus provides greater efficiency in operation as compared with the large control boxes known in the prior art, and the control apparatus reduces capital costs by providing more area capacity for the placement of flotation cells. The vessel has a bottom and sides, and has first and second interior chambers formed by a divider positioned within the vessel. The divider provides a valve seat against which a movable valve body is positionable to prevent fluid from flowing between the two interior chambers. The valve and valve seat are selectively operable to control movement of liquid received from a flotation cell through the vessel.

The vessel is formed with an inlet which opens into the first interior chamber of the vessel. The inlet is positioned to receive liquid (e.g., pulp or slurry) from a flotation cell positioned upstream from the vessel. The vessel also includes an outlet which opens from the second interior chamber to provide a point of discharge of fluid flowing through the vessel. The outlet may typically be connected to another flotation cell which is positioned adjacent to and downstream from the other flotation cell to which the inlet of the vessel is attached. Alternatively, the outlet may be positioned to direct fluid to a discharge outlet for further processing. In one embodiment of the invention, both the inlet and the outlet of the vessel may each have associated therewith an isolation valve which may be operated to prevent fluid flow out of or into the flotation cell at the point of connection of the vessel to each flotation cell. Thus, the isolation valve of the inlet and outlet may be engaged so that the vessel can be taken off-line for maintenance or repair. In such an embodiment, two control apparatus may be interconnected between adjacent flotation cells so that fluid flow from a first flotation cell may be directed through two separate vessels into the adjacent and downstream cell, and at any given time, one of those vessels may be taken off-line, leaving the other vessel to provide necessary fluid control. Little or no interruption in separation processing is experienced.

The vessel of the control apparatus is structured with a divider which demarcates the interior of the vessel into a first interior chamber and a second interior chamber. The divider is formed with at least one aperture providing a passageway for fluid flowing from the first interior chamber to the second interior chamber. The aperture defines a valve seat against which a movable valve body is selectively positionable. The valve body may generally be frustoconical in shape, but the exterior surface of the valve body is especially adapted with a defined curvature, extending from the top of the frustoconical member to the bottom thereof, which insures a selectively controllable flow rate of liquid through the valve.

More specifically, prior art valves are known which use a frustoconical valve body with an exterior surface which is linear from the top of the valve body to the bottom of the valve body. A space or gap forms between the valve seat and the external surface of the valve body as the valve body moves away from the valve seat. The amount of fluid which passes through the space or gap between the valve seat and valve body can be progressively plotted as the gap widens. Experimental values show that with conventional valve bodies having a linear outer surface, the amount of fluid which moves through the valve increases very rapidly as the valve body begins to disengage from the valve seat, but also levels off rapidly to a constant flow rate, resulting in a non-linear flow rate. In the present invention, the outer surface of the valve body is curved in such a manner that the gap which forms between the valve seat and the outer surface of the valve body widens selectively to produce a fluid flow rate proportionate to the gap provided between the valve seat and valve body. In other words, a plotting of the flow rate through the valve of the present invention reveals a substantially linear increase in flow rate. As a result, the amount of fluid released through the valve can be very finely controlled.

The valve body is connected to an actuation mechanism which moves the valve body relative to the valve seat for opening and closing the valve. The actuation mechanism may be any suitable device which causes the valve body to move relative to the valve seat to selectively open or close the valve responsive to a stimulus or to an indication that the fluid level in the associated flotation cell needs to be modified (i.e, either increased or decreased). One example of a suitable actuation mechanism is an electromechanical mechanism interconnected between a movable rod attached to the valve body and a fluid level detector attached to the flotation cell which signals the movable rod to open or close the valve responsive to the fluid level in the flotation cell. Alternatively, an actuation mechanism may operate responsive to a change in pressure differential, usually detected between the pressure in the first interior chamber of the vessel and a pressure external to the vessel (e.g., the pressure in the flotation cell). Such actuation mechanism may comprise the use of one or more flexible diaphragms.

The reduced size of the flotation cell fluid level control apparatus of the present invention, as compared with conventional control devices, reduces the capital costs of operating a single flotation cell or a plurality of flotation cells because the control apparatus of the present invention is easier to build and maintain, and reduces the number of wear components required in the construction. More importantly, the reduced size of the control apparatus allows multiple flotation cells to be positioned closer together in a manifold arrangement which translates to greater area capacity for flotation cell operation and separation processes. These and other benefits of the present invention will become apparent in the description of the illustrated embodiments, which follows.

BRIEF DESCRIPTION OF THE DRAWINGS

In the drawings, which illustrate what is currently considered to be the best mode for carrying out the invention.

DETAILED DESCRIPTION OF THE ILLUSTRATED EMBODIMENTS

Figure 1:
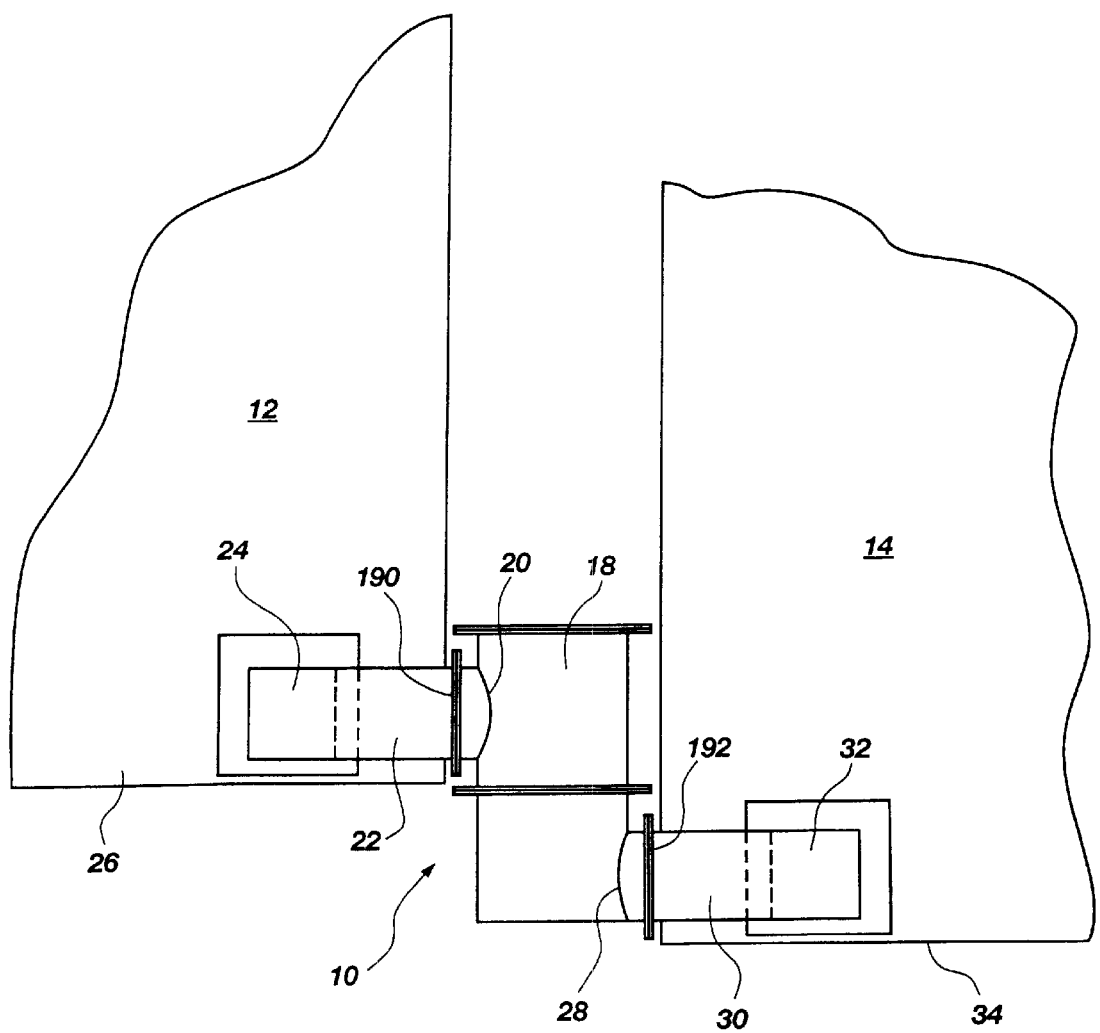
FIG. 1 is a side view in elevation of the control apparatus of the present invention shown positioned between two adjacent flotation cells.

FIG. 1 provides a general view of the fluid level control apparatus 10 of the present invention as it is typically positioned between, and interconnected to, a first flotation cell 12 and a second flotation cell 14. The flotation cells 12, 14 illustrated in FIG. 1 are only partially shown, but are obviously significantly larger in size than the control apparatus 10. The control apparatus 10 generally comprises a vessel 18 which is of significantly smaller area in lateral cross section than the flotation cell(s) 12, 14 to which it is connected. The vessel 18 has an inlet 20 which is in fluid communication with the first flotation cell 12 via an inlet conduit 22. The inlet conduit 22 is connected to the first flotation cell 12 and is aligned with an underflow port 24 formed through the side of the first flotation cell 12. As used herein, "underflow" refers to liquid flowing from near the bottom of a flotation cell and does not necessarily refer to the nature or character of the liquid. Underflow exiting from near the bottom 26 of the first flotation cell 12 moves through the underflow port 24, through the inlet conduit 22 of the control apparatus 10 and into the interior of the vessel 18. Fluid flowing through the vessel 18 moves through an outlet 28 formed in the vessel 18 and into the second flotation cell 14 via an outlet conduit 30 which is connected to the second flotation cell 14. The outlet conduit 30 of the control apparatus 10 is aligned with an inlet port 32 formed through the side of the second flotation cell 14 and fluid flowing through the outlet conduit 30 is delivered into an area near the bottom 34 of the second flotation cell 14 for further separation and processing.

Figure 2:
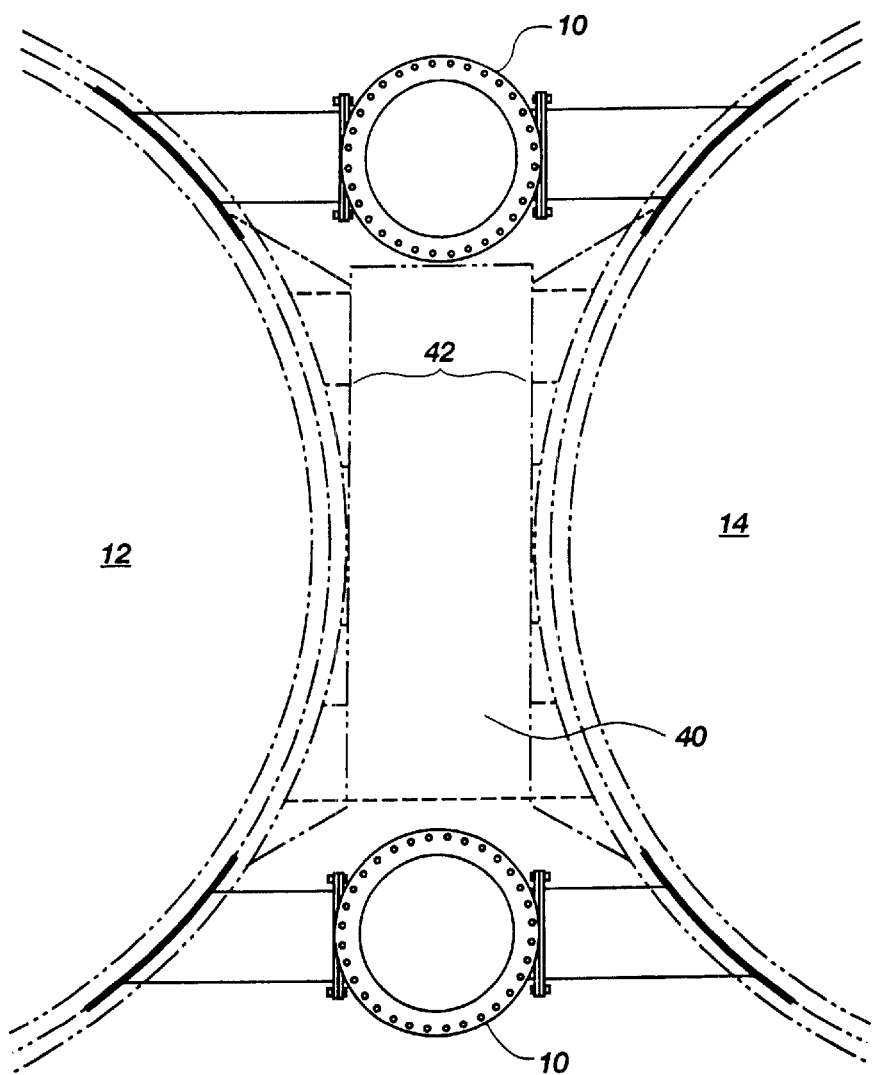
FIG. 2 is a plan view of a portion of two adjacent flotation cells illustrating, for comparative purposes, two control apparatus of the present invention positioned between the adjacent flotation cells and positioning of a conventional fluid level control device, shown in phantom and positioned between the two flotation cells.
Figure 3:
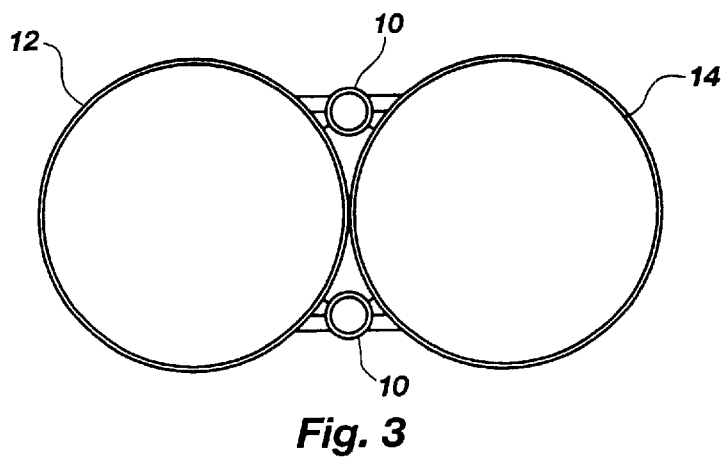
FIG. 3 is a plan view of two adjacent flotation cells illustrating the relative spacing of the tanks which can be achieved with use of the control apparatus of the present invention.

The comparative size and positioning of the control apparatus 10 relative to the adjacent flotation cells 12, 14 are illustrated further in FIGS. 2 and 3. Specifically, FIG. 2 shows two adjacent flotation cells 12, 14 as they would normally be positioned and located relative to each other when a conventional fluid level control box, shown in phantom at 40, is employed for controlling the fluid level between the two flotation cells 12, 14. It can be seen from FIG. 2 that conventional control boxes 40, by their design, require and occupy a considerable amount of space between the flotation cells 12, 14, thus necessitating the spacing apart of adjacent flotation cells to accommodate the large box 40. Conventional control boxes 40 may range in width 42 from four to six feet. As a result of those spacing requirements, fewer flotation cells can be arranged in a given area of plant operation and capital costs increase accordingly.

However, because of the reduced size of the control apparatus 10 of the present invention, one or more control apparatus 10 can be positioned between two adjacent flotation cells 12, 14 without requiring additional spacing, as shown in FIG. 3. Two adjacent cells 12, 14 can be positioned in virtual abutment with one another to maximize the number of flotation cells in a given area of a plant site. The ability to increase the number of flotation cells in a given area not only increases the productivity of the separation process, but can reduce capital costs by as much as one million dollars or more. Thus, a significant advantage is gained by employing the control apparatus 10 of the present invention in controlling the amount of fluid in flotation cells. As shown by FIGS. 2 and 3, more than one control apparatus 10 may be interconnected between adjacent flotation cells 12, 14 to increase the flow rate between the flotation cells and to increase the selective control of flow rates through the vessel 18. Additionally, the ability to employ more than one control apparatus 10 between flotation cells allows one of the control apparatus 10 to be taken off-line for repairs or maintenance, if necessary, while maintaining flow between the adjacent flotation cells 12, 14.

Figure 4:
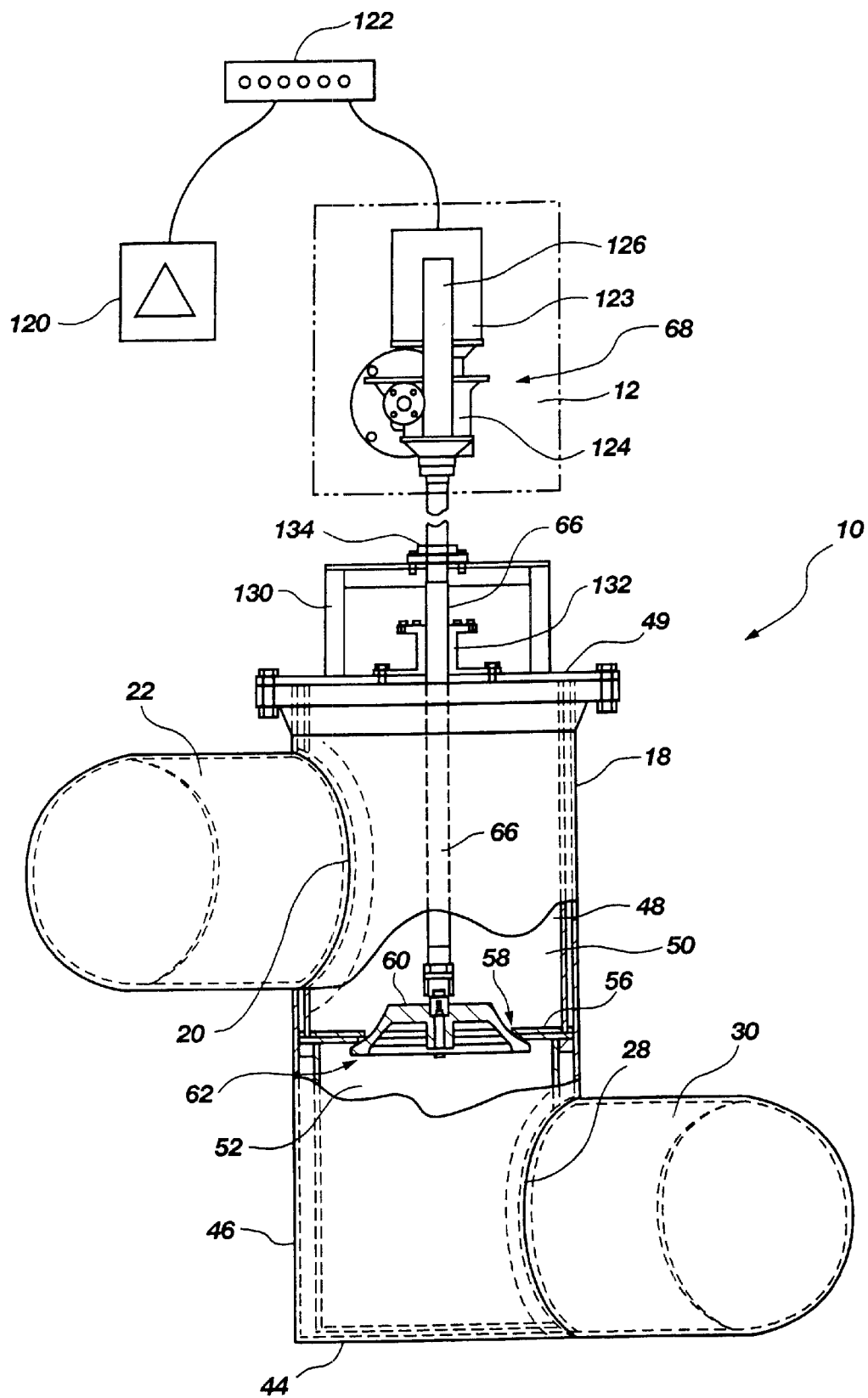
FIG. 4 is an enlarged view of a control apparatus of the present invention, shown in partial cutaway, and the valve body shown in cross section.

The fluid level control apparatus 10 of the present invention is shown in greater detail in FIG. 4. The vessel 18 of the control apparatus 10 has a bottom 44 and a substantially continuous side surrounding an interior space 48. The vessel 18 also includes a top 49 which partially or, preferably, completely encloses the vessel 18. The vessel 18 is shown in FIGS. 1–5 as being generally cylindrical in shape in lateral cross section. Although a cylindrical shape is illustrated, the vessel 18 may be any suitable configuration or geometry, including being square- or rectangular-shaped in lateral cross section (i.e., having four or more straight, contiguous vertical sides which form the wall 46). It is only important to note that the vessel 18 is comparatively smaller in lateral cross section area than the associated flotation cell(s). For example, the diameter of the vessel 18 may be between about two to four feet, compared to the ten to eighteen feet diameter of the flotation cell.

The vessel 18 is shown in partial cutaway to illustrate that the interior space 48 of the vessel 18 is divided into a first interior chamber 50 and a second interior chamber 52. The first interior chamber 50 is separated from the second interior chamber 52 by a divider 56 which transects the interior space 48 of the vessel 18. The inlet 20 of the vessel 18 opens into the first interior chamber 50 to deliver liquid from the inlet conduit 22 into the first interior chamber 50. The outlet 28 of the vessel 18 opens out from the second interior chamber 52 to direct liquid into the outlet conduit 30. The divider 56 of the vessel 18 is configured with at least one opening 58 formed therethrough which provides a fluid pathway for flow of fluid from the first interior chamber 50 to the second interior chamber 52. A movable valve body 60 is positioned through the opening 58 in the divider 56 to provide a selectively openable valve 62. The movable valve body 60 is attached to an extended movable rod 66 which, when actuated by an actuation mechanism 68, causes the valve body 60 to move into or out of registration with the divider 56.

Figure 5:
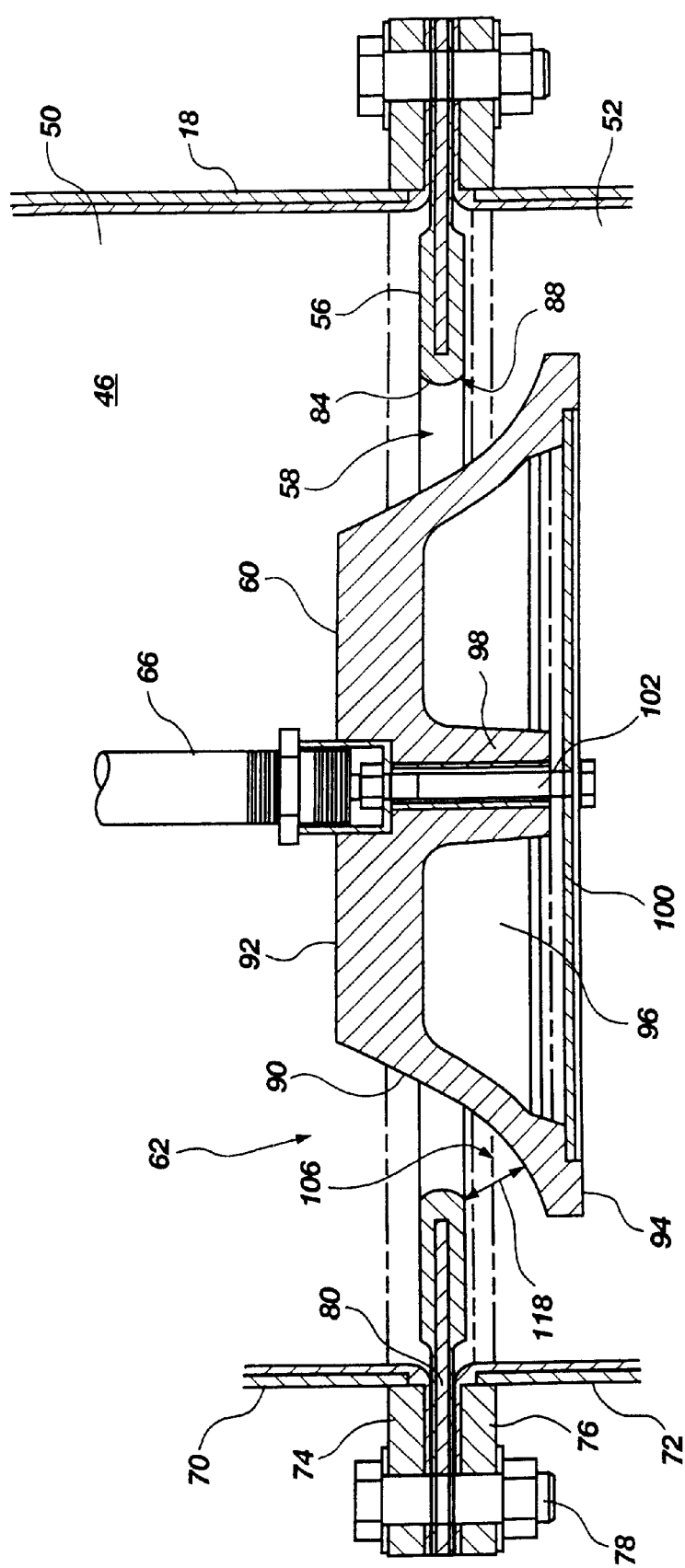
FIG. 5 is an enlarged view in cross section of the valve, showing the relative placement of the valve body to the valve seat.

As shown more clearly in FIG. 5, the vessel 18 may be formed of separate walled structures, such as a first walled structure 70 and a second walled structure 72, each of which are formed with a flange 74, 76, respectively, at one end thereof. When the flanges 74, 76 of the walled structures 70, 72 are brought into registration with each other, and are secured together, such as by a bolt 78, rivet, or other attachment device, the adjoined walled structures form the vessel 18. The divider 56, as shown, may also be structured with a flange 80 which may be secured between the flanges 74, 76 for maintaining the divider 56 in position between the first interior chamber 50 and second interior chamber 52. Although the illustrated configuration of the vessel 18 and divider 56 facilitate simplified repair and maintenance of the control apparatus 10 and valve 62, the vessel 18 may, alternatively, be formed as a single, integrally formed enclosure and the divider 56 may, for example, be welded to the interior wall of the vessel 18. Other means of construction or configuration of the vessel 18 and divider 56 are possible.

The divider 56 has at least one opening 58 formed therethrough to provide a pathway for fluid exiting the first interior chamber 50 and entering the second interior chamber 52. The inner edge 84 of the divider 56 defines a valve seat 88 against which the outer curved surface 90 of the valve body 60 comes into contact to provide a selectably openable valve 62. The valve body 60 of the present invention may generally be frustoconical in shape, having an outer curved surface 90 which extends from a top plane 92 of the valve body 60 to a bottom plane 94 of the valve body 60. The valve body 60 is most suitably made from an elastomeric or polymeric material characterized by having a relatively greater abrasion resistance and greater durometer hardness (e.g., 40–60 Shore A). The valve body 60 may be formed, as shown, with an inner recess 96 encircling a central core 98. The valve body 60 may also be structured with a reinforcing member 100, such as a metal plate, which encloses the inner recess 96 of the valve body 60 and is generally aligned with the bottom plane 94 of the valve body 60. The reinforcing member 100 is secured in place along the bottom plane 94 of the valve body 60 by a bolt 102 or other suitable fastener positioned through the central core 98 of the valve body 60. Alternatively, the valve body may be formed as a solid or substantially solid body. The valve body 60 is connected to the actuation rod 66 by attachment of the bolt 102 positioned through the central core 98.

Figure 6:
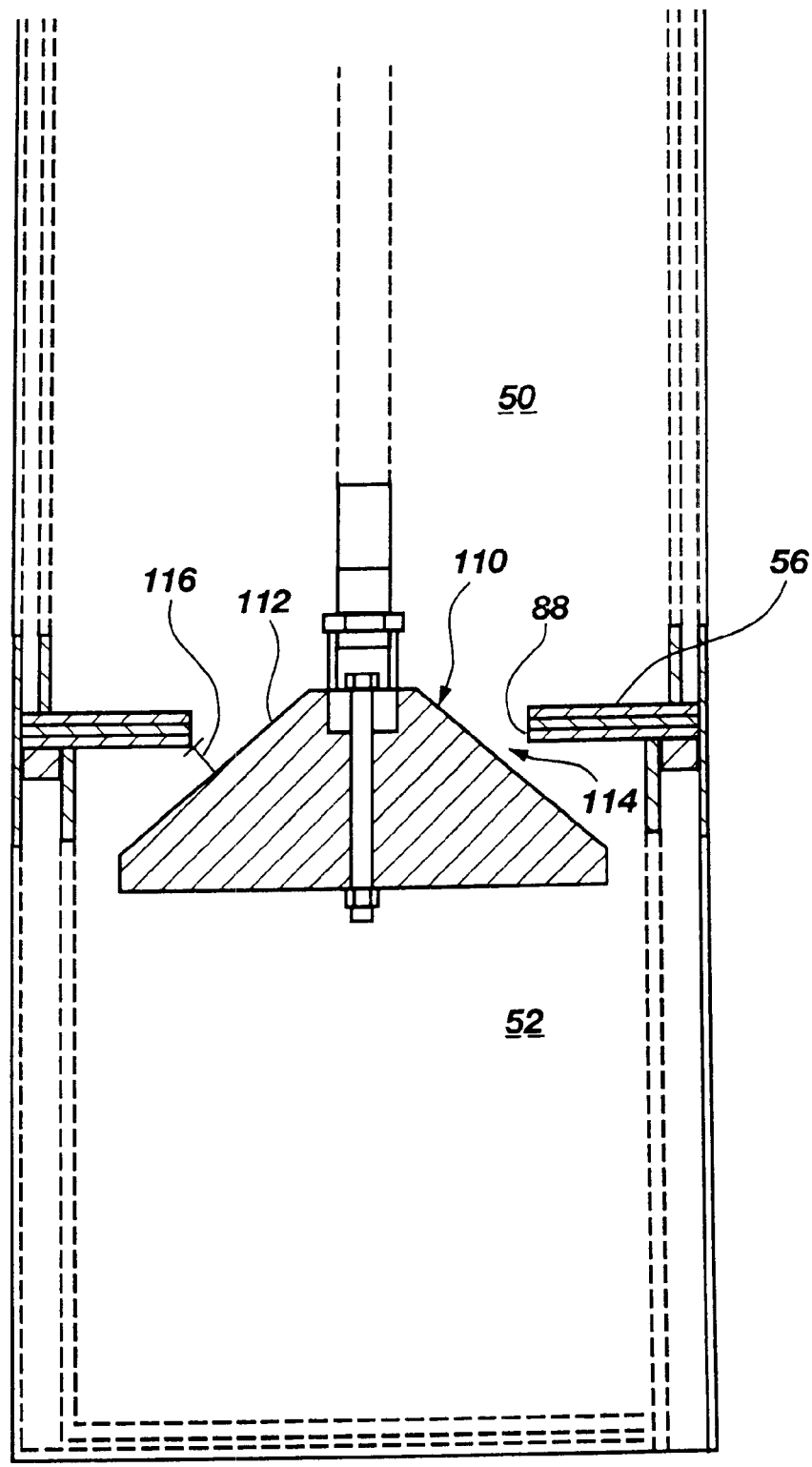
FIG. 6 is a view in cross section of a conventional valve for comparative purposes.

The outer curved surface 90 of the valve body 60 is configured specifically to provide selective control of fluid flow through the opening 58 in the divider 56. That is, as the outer curved surface 90 of the valve body 60 moves away from its position in registration against the valve seat 88, a gap 106 forms between the valve body 60 and the valve seat 88. As the valve body 60 moves farther from the valve seat 88, the gap 106 widens to release an increasing amount of fluid from the first interior chamber 50 into the second interior chamber 52 of the vessel 18. In a similar fashion, prior art valve bodies 110, as shown in FIG. 6, have a planar or linear outer surface 112 which comes into registration with the valve seat 88 of the valve. As the valve body 110 moves away from the valve seat 88, an increasing amount of fluid moves from a first interior chamber 50 to a second interior chamber 52. The gap 114 that forms between the surface 112 of the valve body 110 and the valve seat 88 increases in width 116 as the valve body 110 moves away from the valve seat 88. Notably, the width 116 of the gap 114 is measured from the point of the valve seat 88 which contacts the valve body 110 to the surface 112 of the valve body 110 along a line which is generally perpendicular to the surface 112 of the valve body 110.

Figure 7:
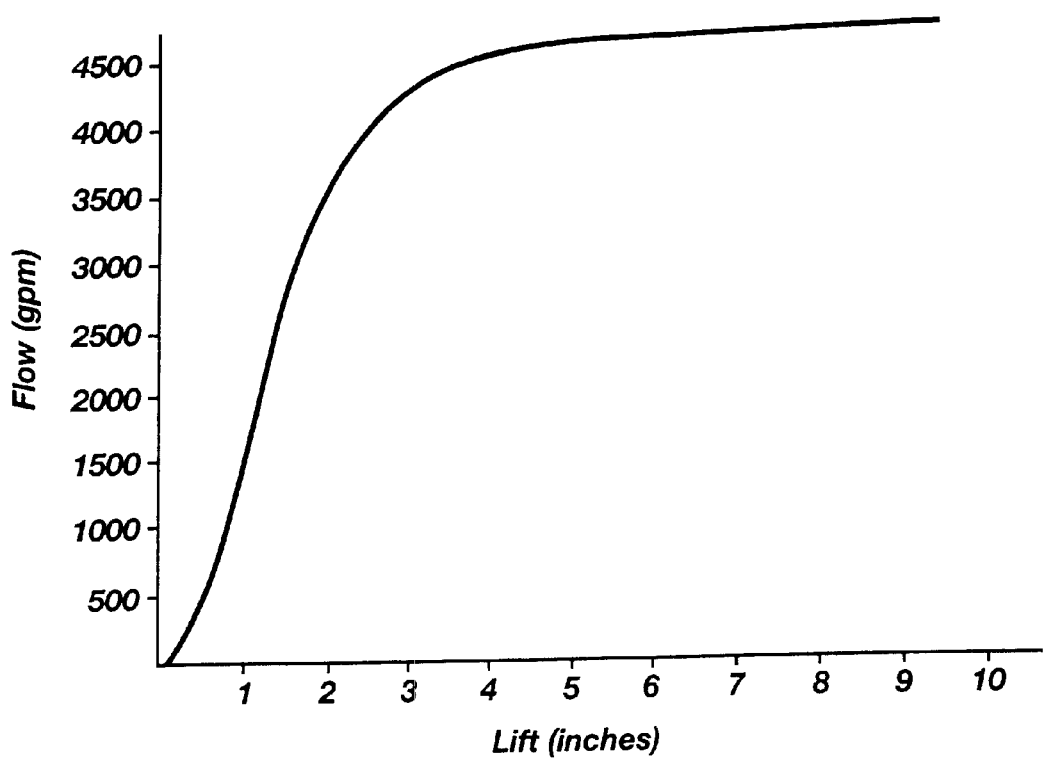
FIG. 7 is a graph illustrating the flow rate experienced with a conventional valve.

The observed flow rates of fluid moving through the gap 114 formed by prior art valves, as illustrated in FIG. 6, are shown in the graph of FIG. 7. It can be see that as the valve body 110 of prior art valves moves away from the valve seat 88, there is an initial significant rate of fluid flow through the gap 114 such that fluid flow has approached a maximum fluid flow rate (e.g., 4,000 to 4,500 gallons per minute) with relatively little movement of the valve body 110 away from the valve seat 88 (i.e., from one to three inches). The fluid flow rate then levels off rapidly. As a result, flow of liquid through the valve is non-linear. It can readily be seen, therefore, that the linear surface configuration of the valve body 110 of prior art valves provides little control of fluid flow rates through the valve.

Figure 8:
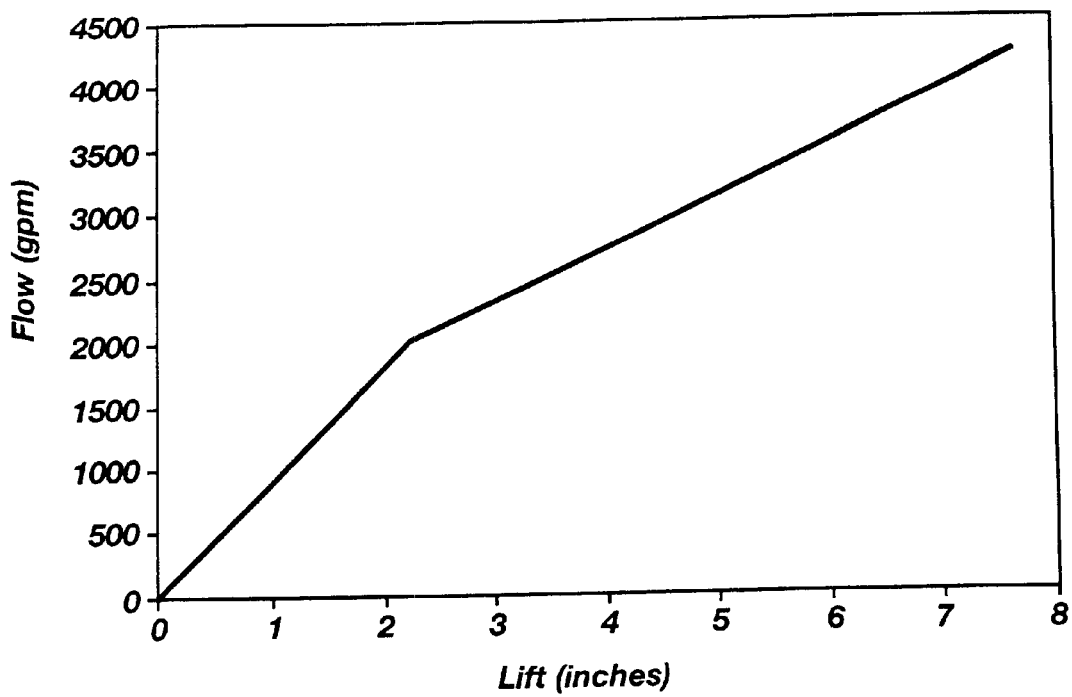
FIG. 8 is a graph illustrating the linear flow rate achieved through use of the valve of the present invention.

Contrary to the lack of control of flow rates experienced in prior art valves, the outer curved surface 90 of the valve body 60 of the present invention is especially designed to provide greater control of fluid flow rates through the gap 106 formed by movement of the valve body 60 away from the valve seat 88. Specifically, the outer curved surface 90 of the valve body 60 is formed with a radius of curvature which produces a linear flow rate through the valve 62, as illustrated more fully by the graph of FIG. 8. It can be seen from FIG. 8 that as the distance 118 (measured in inches) between the valve seat 88 and the outer curved surface 90 increases, there is a gradual, or linear, increase in the flow rate of fluid moving through the gap 106. The curvature of the outer curved surface 90 provides a gradual increase in fluid flow rate which translates into an increased ability to control the flow of fluid through the vessel 18, and thus finely control the level of fluid in the associated flotation cell.

While the radius of curvature of the outer surface 90 may vary in accordance with the configuration of the valve seat 88 and the size of the valve body 60, a polynomial equation has been developed for establishing the preferred radius of curvature which will provide a substantially linear flow rate through the valve, as follows:

$$Y = 0.1084x^3 - 2.9884x^2 + 25.756x - 65.622,$$

where x and y describe the coordinates on an x/y axis formed through the central (vertical) axis of the valve body 60.

The valve 62 is actuated to release fluid from the first interior chamber 50 to the second interior chamber 52 by movement of a movable rod 66, also referred to herein as an "actuation rod," which is secured to the valve body 60. The actuation rod 66 is caused to move by an actuation mechanism 68 which is attached to or aligned in some manner with the actuation rod 66. The actuation mechanism 68 may be any suitable device which operates responsive to a given condition in the flotation cell 12 to which the fluid level control apparatus 10 is attached, such as a detected rise or fall of fluid level in the flotation cell, or to a given condition existing within the control apparatus 10 itself, such as a change in pressure conditions detected within the vessel 18.

One embodiment of a suitable actuation mechanism 68 is shown in FIG. 4 where the actuation mechanism 68 is in electrical communication with a fluid level monitor device 120 which may typically be located in the flotation cell 12 in proximity to the fluid level in the tank. The fluid level monitor device 120, shown in a representational fashion, may be any suitable mechanism, such as an electronic float level detector or pressure transducer, which is capable of detecting a change in fluid level within a given range. The detection of a change in fluid level within the flotation cell sends a signal to a control unit 122, representationally shown, which, in turn, sends a signal to the motor 123 or drive mechanism of the actuation mechanism 68. The motor 123 or drive mechanism initiates a gear reduction unit 124 which causes a jack rod 126 to move, thereby acting upon the actuation rod 66. As shown in FIG. 4, the movement of the actuation rod 66 may be a substantially vertical movement. Although a mechanical system is shown, the actuation rod may be moved by electrical, pneumatic or hydraulic means as well. Although the actuation mechanism 68 is illustrated in FIG. 4 as being attached to the flotation cell 12, the actuation mechanism 68, for example, may be supported by a support bracket 130 which is attached to the top 49 of the vessel 18.

As further illustrated in FIG. 4, the actuation rod 66 extends from the valve body 60 through the first interior chamber 50 and through an aperture formed in the top 49 of the vessel 18. The actuation rod 66 extends above the top 49 of the vessel 18 to the actuation mechanism 68. A combination seal with bearing 132, preferably made of an elastomeric or polymeric material, is secured to the top 49 of the vessel 18 and surrounds the actuation rod 66 to seal the vessel 18 from fluid and pressure leaks. The seal 132 is constructed to provide slidable movement of the actuation rod 66 therethrough as it moves responsive to the actuation mechanism 68. The actuation rod 66 also preferably extends through a guide collar 134 which, as illustrated, may be attached to a support bracket 130 connected to the top 49 of the vessel 18. The guide collar 134 helps maintain the actuation rod 66 in alignment as it moves back and forth responsive to the actuation mechanism 68. The guide collar 134 is constructed to accommodate the sliding movement of the actuation rod 66 therethrough.

Figure 9:
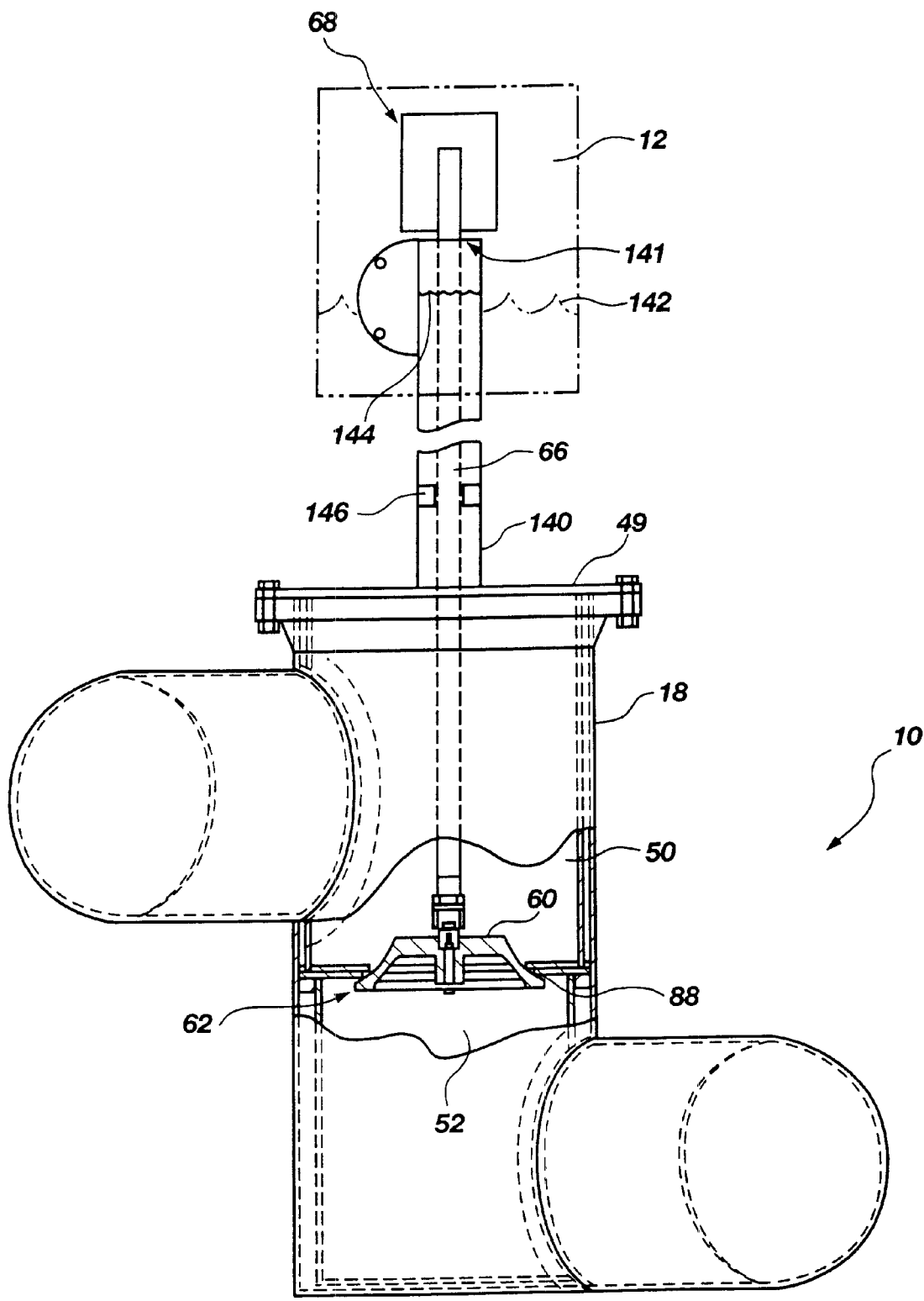
FIG. 9 is a view in elevation of the fluid level control apparatus of the present invention illustrating an alternative actuation mechanism including a riser pipe.

An alternative embodiment of the vessel 18 and actuation mechanism 68 of the present invention is shown in FIG. 9. In the illustrated embodiment, a riser pipe 140 is connected to the top 49 of the vessel 18 and extends beyond the top 49. The riser pipe 140 is sized in diameter to accommodate the positioning of the actuation rod 66 therethrough. The actuation rod 66 extends from the valve body 60 to the actuation mechanism 68 to which it is connected for movement. The riser pipe 140 is sized in length to extend from the top 49 of the vessel 18 to a point 141 above the fluid level, represented at dotted line 142, in the flotation cell 12 to which the control apparatus 10 is attached. The riser pipe 140 serves to eliminate the need for seals positioned about the actuation rod 66 to seal the vessel 18 from liquid and pressure leaks. The use of seals, while suitable, are naturally subject to degradation from high pressures and contact with fluids. Therefore, the riser pipe 140 eliminates the need to use, and ultimately replace, the seals shown, for example, in FIG. 4.

Because the riser pipe 140 extends to a point above the fluid level 142 in the flotation cell 12, the fluid level in the riser pipe 140, designated at 144, approximates the fluid level 142 in the flotation cell 12 at all times. As the valve 62 opens due to movement of the actuation rod 66, moving the valve body 60 out of registration with the valve seat 88, the fluid level 144 in the riser pipe 140 will fall as fluid moves through the first interior chamber 50 to the second interior chamber 52, and will approximate the fluid level 142 in the flotation tank 12 as it drops. As the valve 62 closes, the fluid level 144 in the riser pipe 140 will maintain a level in conformance with the fluid level 142 in the flotation cell 12. Thus, in the embodiment illustrated in FIG. 9, the pressure in the first interior chamber 50 is generally greater than atmospheric during periods when the valve 62 is open and when it is closed. Further, a guide member 146 is preferably positioned about the actuation rod 66 at some point along its length to maintain the actuation rod in alignment with the valve body 60. In a preferred embodiment, the guide member 146 may be positioned within the riser pipe 140 to aid in centering the actuation rod 66 within the riser pipe 140 and to maintain alignment. The guide member 146 is structured to allow the actuation rod 66 to move slidingly therethrough, and is structured to allow the fluid level 144 in the riser pipe 140 to adjust responsively to changes in flow rates and pressures.

Figure 10:
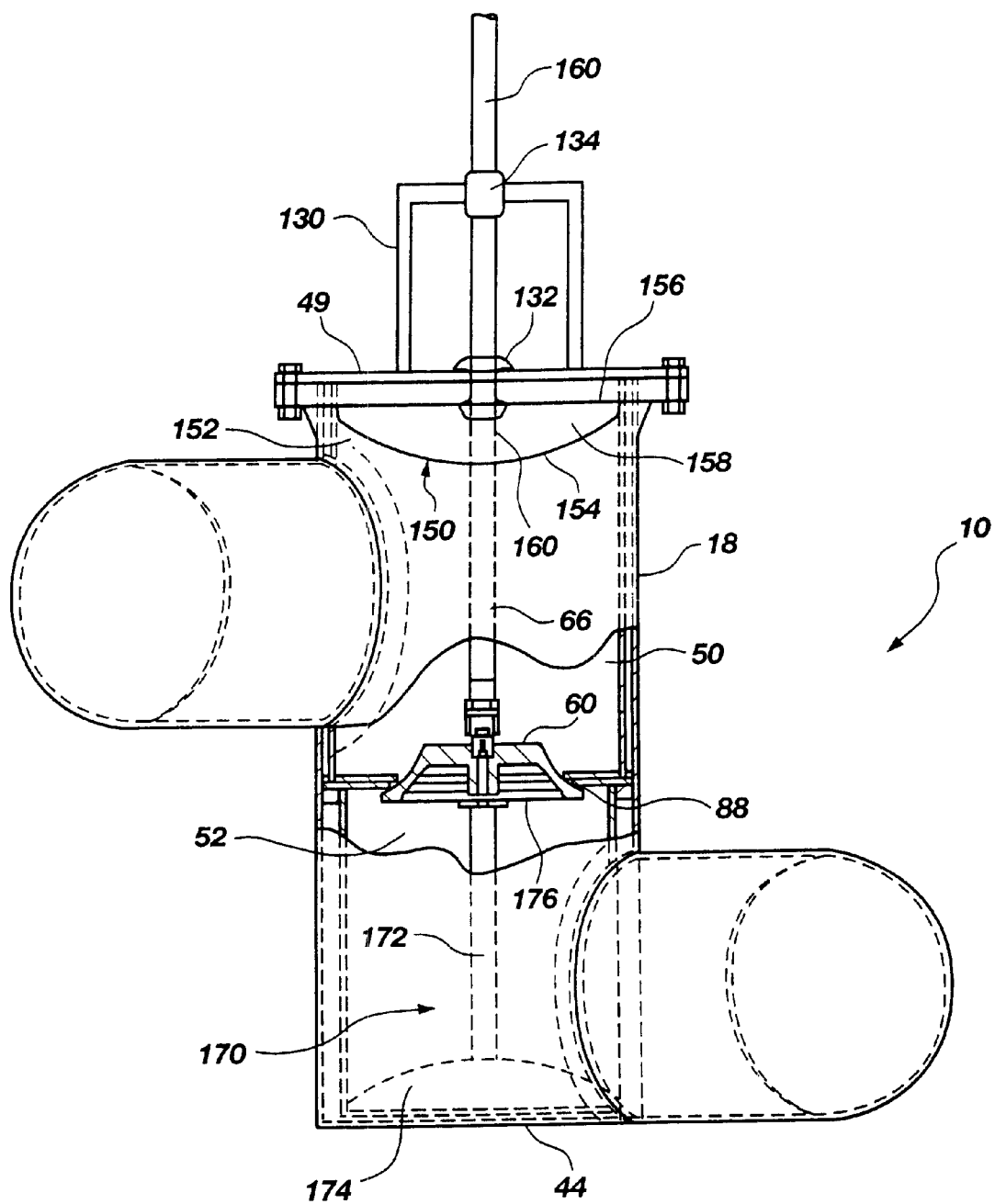
FIG. 10 is a view in elevation of the control apparatus illustrating another alternative actuation mechanism comprising a first and second movable diaphragm for operating the valve.

In yet another alternative embodiment shown in FIG. 10, the actuation rod 66 is secured to a diaphragm 150 positioned in the upper portion 152 of the first interior chamber 50 of the vessel 18. The diaphragm 150 comprises a flexible membrane 154 extending into the first interior chamber 50, a partition 156 positioned near the top 49 of the vessel 18 and a sealed space 158 formed between the flexible membrane 154 and the partition 156. The space 158 may be filled with a fluid, the pressure or volume of which is subject to change, thereby causing the flexible membrane 154 to move in a back and forth manner in the direction of the longitudinal axis of vessel 18. The fluid in the space 158 may be either liquid or gas.

A reciprocating rod 160 is attached to the flexible membrane 154 of the diaphragm 150 and is in axial alignment with the actuation rod 66. The reciprocating rod 160 extends from the flexible membrane 154 of the diaphragm 150, through the partition 156 and through an aperture formed in the top 49 of the vessel 18. The reciprocating rod 160 also extends beyond the top 49 of the vessel 18 and may, preferably, extend through a guide collar 134 which helps maintain the reciprocating rod 160 in alignment as it moves back and forth through the top 49 of the vessel 18. A seal 132 is positioned about the reciprocating rod 160 and the aperture formed in the top 49 to maintain a fluid and pressure seal in the first interior chamber 50 of the vessel 18. The seal 132 extends through the aperture in the top 49, encircling the reciprocating rod 160, and extends through the partition 156 of the diaphragm 150 to maintain a fluid seal between the diaphragm 150 and the top 49. The seal 132 is constructed to allow the reciprocating rod 160 to move slidingly therethrough.

The diaphragm 150 acts as an actuation mechanism 68 in causing the actuation rod 66 to move and thereby cause the valve body 60 to move away from the valve seat 88. Thus, when the pressure or volume of the fluid in the space 158 of the diaphragm 150 expands or increases, the flexible membrane 154 flexes toward the valve body 60 and the actuation rod 66 is forced downward, thereby forcing the valve body 60 from the valve seat 88 and opening the valve 62. The reciprocating rod 160 moves with the actuation rod 66 in the direction of the valve body 60 as the diaphragm 150 flexes.

The control apparatus 10 of the embodiment shown in FIG. 10 also includes a reciprocating actuation mechanism 170 positioned in the second interior chamber 52 of the vessel 18 which operates to move the valve body 60 back into registration with the valve seat 88. The reciprocating actuation mechanism 170 generally comprises a reciprocating column 172 which extends from a flexible diaphragm 174 positioned in the bottom 44 of the vessel 18 to the bottom 176 of the valve body 60 to which the reciprocating column 172 is connected. The diaphragm 174 may be filled with a fluid, such as a liquid or gas, which imparts a degree of deflection in the diaphragm 174. As the actuation rod 66 is moved by the actuation mechanism 68, as previously described, the valve body 60 disengages from the valve seat 88 to open the valve 62. Because the reciprocating column 172 of the reciprocating actuation mechanism 170 is attached to the bottom 176 of the valve body 60, the reciprocating column 172 is forced in a direction away from the valve seat 88 and presses against the diaphragm 174 causing it to deflect inwardly toward the bottom 44 of the vessel 18.

Responsive to a pressure change in the first interior chamber 50, the actuation rod 66 moves toward the top 49 of the vessel 18 to close the valve 62. The reciprocating actuation mechanism 170 assists in moving the valve body 60 back into registration with the valve seat 88 by automatic deflection of the diaphragm 174 toward the top 49 of the vessel 18, with a resulting force being applied to the reciprocating column 172. The movement of the reciprocating column 172 helps move the valve body 60 back toward the valve seat 88. The reciprocating actuation mechanism 170 illustrated in FIG. 10 is by way of example and other equally suitable elements may be employed to provide the movement as described.

As illustrated herein, the fluid level control apparatus 10 of the present invention is shown as a generally vertical vessel 18 providing movement of fluid from an upper (first) interior chamber 50 to a lower (second) interior chamber 52. However, the vessel 18 of the control apparatus 10 need not be vertical in orientation, but may be structured in any suitable manner for the particular application, including horizontally oriented interior chambers. Additionally, it may be necessary or desirable to employ more than one valve of the type described herein. That is, it may be desirable to provide two or more apertures in the divider between the first and second interior chambers, and employ a valve for each aperture. The plurality of valves may each have independent actuation mechanisms associated therewith or, alternatively, may be connected to a manifold for actuating each valve simultaneously.

The control apparatus 10 of the present invention provides advantages of design, construction and operation which make it easier to use and operate than prior art control boxes. By virtue of its reduced size, the control apparatus of the present invention is less costly to use and is less costly to maintain. As illustrated in FIGS. 2 and 3, two control apparatus 10 may be installed between adjacent flotation cells to control the fluid level in those associated flotation cells with greater efficiency than the single large control boxes that are conventionally used in industry. In addition, the control apparatus 10 can be structured, as shown in FIG. 1, with an isolation valve 190 attached to the inlet conduit 22 and an isolation valve 192 attached to the outlet conduit 30 to enables the inlet conduit 22 and outlet conduit 30 to be isolated from fluid communication with the control apparatus 10 so that the control apparatus 10 may be taken off-line for repair and maintenance. The other control apparatus 10 interconnected between the adjacent flotation cells may continue in operation to avoid disruption of separation processing.

The flotation cell fluid level control apparatus of the present invention may be used in connection with any number of flotation cells and may be specifically employed in a variety of applications. Thus, reference herein to specific details of the illustrated embodiments is by way of example and not by way of limitation. It will be apparent to those skilled in the art that many modifications of the basic illustrated embodiments may be made without departing from the spirit and scope of the invention as recited by the claims.

What is claimed is:

1. A device for selectively controlling a rate of discharge of underflow liquid from a flotation cell to maintain a liquid level within the flotation cell within a desired range responsive to a signal transmitted to an actuation mechanism from a liquid level detector disposed in the flotation cell, the device comprising:
   a vessel having a top, a bottom, a side, a first interior chamber and a second interior chamber, the vessel being of significantly smaller area in lateral cross-section than a flotation cell to which it may be externally connected;
   an aperture in the vessel between the first interior chamber and the second interior chamber for conveyance of liquid therebetween, the aperture being surrounded by an inner edge defining a valve seat;
   an inlet conduit opening into the first interior chamber to provide flow of underflow liquid exiting from near a bottom of a flotation cell in communication with the vessel through the inlet conduit into the first interior chamber of the vessel and an outlet conduit opening from the second interior chamber for discharge of underflow liquid from the vessel; and
   a valve body having a lateral periphery comprising a concave outer surface, the valve body being positioned within the vessel and mounted for longitudinal reciprocating movement by an actuation mechanism transverse to the valve seat with the valve body in constant angular orientation with respect to the valve seat between a first position in sealing engagement with the valve seat and a plurality of positions spaced longitudinally from the valve seat, wherein the concave outer surface is configured with a radius of curvature to provide, in combination with the constant angular orientation, a flow rate of underflow liquid through the aperture which varies in substantially linear relationship with at least some longitudinal positions of the valve seat when longitudinally spaced from the valve seat.

2. The device of claim 1, wherein the top encloses an upper extent of the first interior chamber.

3. The device of claim 1, further comprising an actuation rod connected to the valve body and projecting up through an aperture formed in the top of the vessel, and wherein said device further comprises an annular seal member positioned on the top about the aperture in said top and extending around the actuation rod in sealing, sliding engagement with the actuation rod for holding liquid in the first interior chamber under pressure while enabling the movement of the valve body responsive to movement of the actuation rod.

4. The device of claim 3, further comprising a fluid-actuated diaphragm positioned in the vessel and secured to the actuation rod for effecting the movement thereof responsive to application of a fluid pressure differential to the diaphragm.

5. The device of claim 4, further comprising a reciprocating rod connected to and in alignment with the actuation rod extending through a partition of the diaphragm, a seal on the diaphragm positioned around the reciprocating rod for preventing passage of fluid therepast, and a guide collar for maintaining the alignment of the reciprocating rod during movement.

6. The device of claim 3, further comprising an actuation mechanism for providing the movement of the actuation rod, the actuation mechanism being mounted on the top of the vessel.

7. The device of claim 6, further comprising a reciprocating actuation mechanism positioned at the bottom of the vessel acting in cooperation with the actuation mechanism at the top to move the valve body.

8. The device of claim 1, further comprising a first flotation cell in communication with the inlet conduit and a second flotation cell in communication with the outlet conduit, a first isolation valve positioned in the inlet conduit between the first flotation cell and the vessel and a second isolation valve positioned in the outlet conduit between the vessel and the second flotation cell, the device being positioned external to and between the first and second flotation cells, each of the first and second isolation valves configured for selective closure of their respectively associated conduits, the device being configured between the first and second isolation valves to enable repair and maintenance thereof without fluid loss from the first or second flotation cell when the first and second isolation valves are closed.

9. The device of claim 6, wherein the actuation mechanism is a dual acting reciprocation device configured to drive the actuation rod to move the valve body toward and away from the valve seat.

10. The device of claim 1, further comprising a pair of isolation valves, one between the device and each of two flotation cells between which the device is disposed and with which the device is respectively in connection through the inlet conduit and the outlet conduit, for closing the inlet conduit and the outlet conduit to enable removal and replacement of the device without loss of liquid from either of the two flotation cells.

11. The device of claim 1, further comprising an actuation rod connected to the valve body and a riser pipe extending from an aperture formed in the top to a height above an anticipated highest level of liquid in the flotation cell, the riser pipe being sized in diameter to accommodate the actuation rod and the actuation rod extending upwardly therein.

12. A device for selectively controlling a rate of discharge of underflow liquid from a flotation cell to maintain a liquid level within the flotation cell within a desired range responsive to a signal transmitted to an actuation mechanism from a liquid level detector disposed in the flotation cell, the device comprising:
   a vessel having a bottom, a side, a first interior chamber and a second interior chamber, the vessel being of significantly smaller area in lateral cross-section than a flotation cell to which the vessel may be connected;
   an aperture in the vessel between the first interior chamber and the second interior chamber for conveying liquid therebetween, the aperture being surrounded by an inner edge defining a valve seat;
   an inlet conduit opening into the first interior chamber to provide flow of underflow liquid exiting from near the bottom of the flotation cell into the first interior chamber and an outlet conduit opening from the second interior chamber for discharge of underflow liquid from the vessel;
   a valve member of generally frustoconical configuration and having a concave lateral periphery, taken in vertical section, the valve member positioned for movement within the vessel and mounted for longitudinal reciprocating movement by an actuation mechanism transverse to the valve seat with the valve body in constant angular orientation with respect to the valve seat between a first position in sealing engagement with the valve seat and a plurality of selectable positions longitudinally spaced from the valve seat to selectively provide flow of underflow liquid through the vessel, the concave lateral periphery of the valve member being shaped to provide, in combination with the constant angular orientation of the valve seat, a generally linear relationship between a distance of the movable valve member from the valve seat and a volumetric flow rate of underflow liquid through the aperture.

13. The device of claim 1, further comprising a liquid level detector for disposition in a flotation cell with which the vessel is in communication through the inlet conduit, the first position and the plurality of positions of the valve body being effected by an actuation mechanism responsive to a signal from the liquid level detector indicative of a liquid level within the flotation cell to enable flow of a selected amount of underflow liquid from the flotation cell through the vessel.

14. The device of claim 13, wherein the plurality of positions of the valve body responsive to the signal from the liquid level detector enable flow of underflow liquid from the flotation cell at a respective plurality of selected rates.

15. The device of claim 12, further comprising a liquid level detector for disposition in a flotation cell to which the vessel is connected, the first position and the plurality of positions of the valve member being effected by an actuation mechanism responsive to a signal from the liquid level detector indicative of a liquid level within the flotation cell to enable flow of a selected volume of underflow liquid from the flotation cell through the vessel.

16. The device of claim 15, wherein the plurality of positions of the valve member responsive to the signal from the liquid level detector enable flow of fluid from the flotation cell at selected volumetric flow rates.

17. A device for selectively controlling a rate of discharge of liquid from a flotation cell to maintain a liquid level within the flotation cell within a desired range responsive to a signal transmitted to an actuation mechanism from a liquid level detector disposed in the flotation cell, the device comprising:
   a vessel having a first interior chamber and a second interior chamber;
   an aperture between the first interior chamber and the second interior chamber, the aperture being
      defined by a peripheral edge including a valve seat; an inlet conduit opening into the first interior chamber and an outlet conduit opening from the
      second interior chamber; and a valve body movably positioned within the vessel and mounted for linear movement by an
      actuation mechanism between a first position in peripheral sealing engagement with the valve seat and a plurality of positions differently spaced from the valve seat, wherein said valve body comprises a concave lateral outer surface.

18. The device of claim 17, further comprising a top on the vessel providing an upper closure for the first interior chamber.

19. The device of claim 17, further comprising an actuation rod connected to the valve body and projecting through an aperture formed in an outer wall of the vessel, and wherein the device further comprises an annular seal member positioned proximate the aperture in the outer wall and extending around the actuation rod in sealing, sliding engagement therewith.

20. The device of claim 17, further comprising a fluid-actuated diaphragm positioned on the vessel and secured to an actuation rod inside the vessel for moving the valve body with respect to the valve seat responsive to application of a fluid pressure differential to the diaphragm.

21. The device of claim 20, further comprising a reciprocating rod aligned with and connected to the actuation rod and extending through a partition of the diaphragm, a seal on the diaphragm positioned around the reciprocating rod for preventing fluid passage between the reciprocating rod and the diaphragm, and a guide collar for maintaining alignment of the reciprocating rod for linear movement.

22. The device of claim 17, further comprising a first actuation mechanism mounted proximate one end of the vessel for providing movement of an actuation rod to effect the linear movement of the valve body.

23. The device of claim 22, further comprising a second actuation mechanism positioned proximate an opposing end of the vessel to move the valve body in opposition to the first actuation mechanism at the one end of the vessel.

24. The device of claim 17, further comprising an isolation valve positioned in each of the inlet conduit and the outlet conduit for selectively interconnecting the device between two adjacent flotation cells with the inlet conduit of the vessel in communication with one of the adjacent flotation cells and the outlet conduit of the vessel in fluid flow communication with the other of the adjacent flotation cells.

25. The device of claim 22, wherein the first actuation mechanism is a dual acting reciprocation device configured to drive the actuation rod to move the valve body toward and away from the valve seat.

26. The device of claim 17, further comprising an isolation valve associated with each of the inlet conduit and the outlet conduit with said first and second interior chambers located between the isolation valves.

27. The device of claim 17, further comprising a first flotation cell connected to the inlet conduit, the first flotation cell being of substantially greater lateral cross-sectional area than a cross-sectional area of the vessel transverse to a direction of the linear valve body movement.

28. The device of claim 27, further comprising a second flotation cell connected to the outlet conduit, the second flotation cell being of substantially greater lateral cross-sectional area than a cross-sectional area of the vessel transverse to a direction of the linear valve body movement.

29. The device of claim 27, further comprising a liquid level detector disposed in the first flotation cell for providing a signal indicative of a liquid level in the first flotation cell, and an actuation mechanism for moving the valve body between said first position and said plurality of positions responsive to the signal to selectively discharge liquid from the first flotation cell through the vessel to maintain the liquid level in the first flotation cell within a desired range.

30. The device of claim 17, wherein the outlet conduit opens into the second interior chamber at a location at least partially lower than a location at which the inlet conduit opens into the first interior chamber.

31. The device of claim 17, further comprising an actuation rod connected to the valve body and a riser pipe extending from an aperture formed in a top of the vessel to a height above an anticipated highest level of liquid in the flotation cell, the riser pipe being sized in diameter to accommodate the actuation rod and the actuation rod extending upwardly therein.

32. A device for selectively controlling a rate of discharge of liquid from a flotation cell to maintain a liquid level within the flotation cell within a desired range responsive to a signal transmitted to an actuation mechanism from a liquid level detector disposed in the flotation cell, the device comprising:

a vessel having a first interior chamber and a second interior chamber;

at least one aperture in said vessel between said first interior chamber and said second interior chamber, said at least one aperture being surrounded by at least one inner edge defining at least one valve seat;

an inlet conduit opening into said first interior chamber to provide flow of liquid into said first interior chamber and an outlet conduit opening from said second interior chamber to provide flow of liquid therefrom;

at least one generally frustoconical valve member positioned within the vessel and mounted for linear movement transverse by an actuation mechanism to the valve seat between a first position in sealing engagement with said at least one valve seat and a plurality of positions longitudinally differently spaced from the at least one valve seat to provide selected flows of liquid through said vessel, at least a portion of a lateral periphery of said at least one valve member being generally concave in vertical section and configured to provide a generally linear relationship between at least some distances of said at least one valve member from said at least one valve seat and corresponding volumetric flow rates of liquid through said at least one aperture between said at least one valve member and said at least one valve seat.

33. In combination, a first flotation cell and a device for selectively controlling a rate of discharge of underflow liquid from the first flotation cell to maintain a liquid level within the first flotation cell within a desired range responsive to a signal transmitted to an actuation mechanism from a liquid level detector disposed in the first flotation cell, the device external to the first flotation cell and comprising:

a vessel having a first interior chamber and a second interior chamber;

an aperture between the first interior chamber and the second interior chamber for conveyance of liquid therebetween, the aperture being surrounded by an inner edge defining a valve seat;

an inlet conduit externally connected to the flotation cell, in communication with an interior volume of the first flotation cell and opening into the first interior chamber to provide flow of underflow liquid exiting from the first flotation cell near a bottom of the interior volume into the first interior chamber and an outlet conduit opening from the second interior chamber for discharge of underflow liquid from the vessel; and a valve body positioned within the vessel for movement responsive to a liquid level detected in the first flotation cell and mounted for reciprocating, linear movement by an actuation mechanism between a first position in sealing engagement with the valve seat and a plurality of selectable positions spaced from the valve seat, the valve body including a generally concave lateral periphery configured, in combination with the linear movement thereof, to provide a generally linear relationship between at least some valve body positions spaced from the valve seat and corresponding flow rates through the aperture.

34. The combination of claim 33, wherein the device further comprises a second flotation cell having an interior volume in communication with the outlet conduit, a first isolation valve positioned in the inlet conduit between the first flotation cell and the vessel and a second isolation valve positioned in the outlet conduit between the vessel and the second flotation cell, the device being positioned external to and between the first and second flotation cells, each of the isolation valves configured for selective closure of their respectively associated conduits.

35. The combination of claim 33, wherein the first flotation cell is of substantially greater lateral cross-sectional area than a cross-sectional area of the vessel transverse to a direction of the linear valve body movement.

36. The combination of claim 33, further comprising a second flotation cell to which the outlet conduit is externally connected and in communication with an internal volume thereof, the second flotation cell being of substantially greater lateral cross-sectional area than a cross-sectional area of the vessel transverse to a direction of the linear valve body movement.

37. The combination of claim 33, wherein the device further comprises a liquid level detector disposed in the first flotation cell for providing a signal indicative of a liquid level in the first flotation cell, and an actuation mechanism for moving the valve body between said first position and said plurality of positions responsive to the signal to selectively discharge liquid from the first flotation cell through the vessel to maintain the liquid level in the first flotation cell within a desired range.

38. The combination of claim 33, wherein the outlet conduit of the device opens into the second interior chamber at a location at least partially lower than a location at which the inlet conduit opens into the first interior chamber.

* * * * *